United States Patent
Cox et al.

(10) Patent No.: US 9,513,164 B2
(45) Date of Patent: Dec. 6, 2016

(54) STAND-OFF SPECTROMETRY SYSTEMS AND METHODS

(71) Applicant: Honeywell International Inc., Morristown, NJ (US)

(72) Inventors: James A. Cox, Morristown, NJ (US); Daniel Youngner, Maple Grove, MN (US)

(73) Assignee: Honeywell International Inc., Morris Plains, NJ (US)

( * ) Notice: Subject to any disclaimer, the term of this patent is extended or adjusted under 35 U.S.C. 154(b) by 123 days.

(21) Appl. No.: 13/841,095

(22) Filed: Mar. 15, 2013

(65) Prior Publication Data

US 2014/0268135 A1 Sep. 18, 2014

(51) Int. Cl.
*G01J 3/433* (2006.01)
*G01J 3/10* (2006.01)
*G01J 3/06* (2006.01)
*G01J 3/14* (2006.01)
*G01J 3/18* (2006.01)

(52) U.S. Cl.
CPC .. *G01J 3/10* (2013.01); *G01J 3/06* (2013.01); *G01J 3/14* (2013.01); *G01J 3/18* (2013.01)

(58) Field of Classification Search
CPC .............. G01J 3/02; G01J 3/28; G01J 3/0208; G01J 3/2803; G01J 3/0291; G01J 3/42; G01J 3/36; G01J 3/18; G01J 3/14; G01J 3/26; G01J 3/4338; G01J 2003/2826; G01J 3/0275; G01J 3/427; G01J 2003/104; G01J 2003/2879; G01N 21/31; G01N 21/39; G02B 21/06; G02B 21/0064; G02B 5/1814; G02B 6/29311; G02B 21/022

USPC .......... 356/326, 328, 300, 319, 301, 51, 73, 303,356/334, 432, 451, 330, 320, 454; 250/226, 250/339.07, 339.12; 422/82.05, 82.09
See application file for complete search history.

(56) References Cited

U.S. PATENT DOCUMENTS

| | | | |
|---|---|---|---|
| 7,519,253 B2 | 4/2009 | Islam | |
| 8,259,304 B2 * | 9/2012 | Alphonse ............. | A61B 5/0066 356/479 |
| 8,269,977 B2 * | 9/2012 | Alphonse ........... | G01B 9/02044 356/479 |
| 9,048,625 B2 * | 6/2015 | Zhou ........................ | G01J 3/00 |
| 9,163,930 B2 * | 10/2015 | Buckland ............... | A61B 3/102 |
| 2006/0192960 A1 * | 8/2006 | Rencs et al. .................. | 356/364 |
| 2007/0177145 A1 * | 8/2007 | Ohishi et al. ................. | 356/328 |
| 2008/0204752 A1 | 8/2008 | Dorvee et al. | |
| 2009/0262359 A1 * | 10/2009 | Bajraszewski et al. ...... | 356/454 |
| 2010/0187208 A1 * | 7/2010 | Dantus et al. ........... | 219/121.72 |

(Continued)

OTHER PUBLICATIONS

Kraetschmer, T., ("Hyperspectral Lasers for Spectroscopic Measurements in the Near-infrared," Ph.D. Thesis, University of Wisconsin-Madison, 2009. (http://digital.library.wisc.edu/1793/35131)).*

(Continued)

*Primary Examiner* — Tarifur Chowdhury
*Assistant Examiner* — Mohamed K Amara
(74) *Attorney, Agent, or Firm* — Brooks, Cameron & Huebsch, PLLC

(57) ABSTRACT

Stand-off spectrometry systems and methods are described herein. One system includes a laser source configured to emit a single-spectral light, and an optical frequency comb (OFC) coupled to the laser source and configured to generate, using the single-spectral light, a multi-spectral light to determine an absorption spectrum of a substance.

20 Claims, 3 Drawing Sheets

(56) References Cited

U.S. PATENT DOCUMENTS

| | | | |
|---|---|---|---|
| 2011/0235045 A1* | 9/2011 | Koerner et al. | 356/451 |
| 2011/0261363 A1 | 10/2011 | Picqu et al. | |
| 2013/0314703 A1* | 11/2013 | Cox | 356/326 |
| 2014/0022553 A1* | 1/2014 | Kmer et al. | 356/458 |
| 2014/0028997 A1* | 1/2014 | Cable et al. | 356/51 |

OTHER PUBLICATIONS

"Hydrogen Cyanide" (https://en.wikipedia.org/wiki/Hydrogen_cyanide).*
"Chemical of the Week" (http://scifun.chem.wisc.edu/chemweek/methane/methane.html).*
T.J. Kippenberg et al., "Microresonator-based optical frequency combs," Science 332, pp. 555-9 (2011).
A.C. Turner et al., "Ultra-low power parametric frequency conversion in a silicon microring resonantor," Optics Express 16 (7), pp. 4881-4887 (2008).

* cited by examiner

STAND-OFF SPECTROMETRY SYSTEMS AND METHODS

TECHNICAL FIELD

The present disclosure relates to providing a stand-off spectrometry systems and methods.

BACKGROUND

A stand-off spectrometer can be utilized to identify an unknown substance by determining the absorption spectrum (e.g., spectral content) of the substance. For example, previous stand-off spectrometry may use broadband blackbody light sources (e.g., having a temperature of approximately 1500 Kelvins) and infrared Fourier transform spectroscopy to determine the absorption spectrum of an unknown substance.

The blackbody light sources of such previous stand-off spectrometers, however, may have a low radiation, which can limit the performance of the stand-off spectrometer. For example, previous stand-off spectrometers may not be able to effectively determine the absorption spectrum of an unknown substance, and accordingly may not be able to accurately identify the unknown substance, as a result of the low radiation of their blackbody light sources.

DETAILED DESCRIPTION

Figure 1:
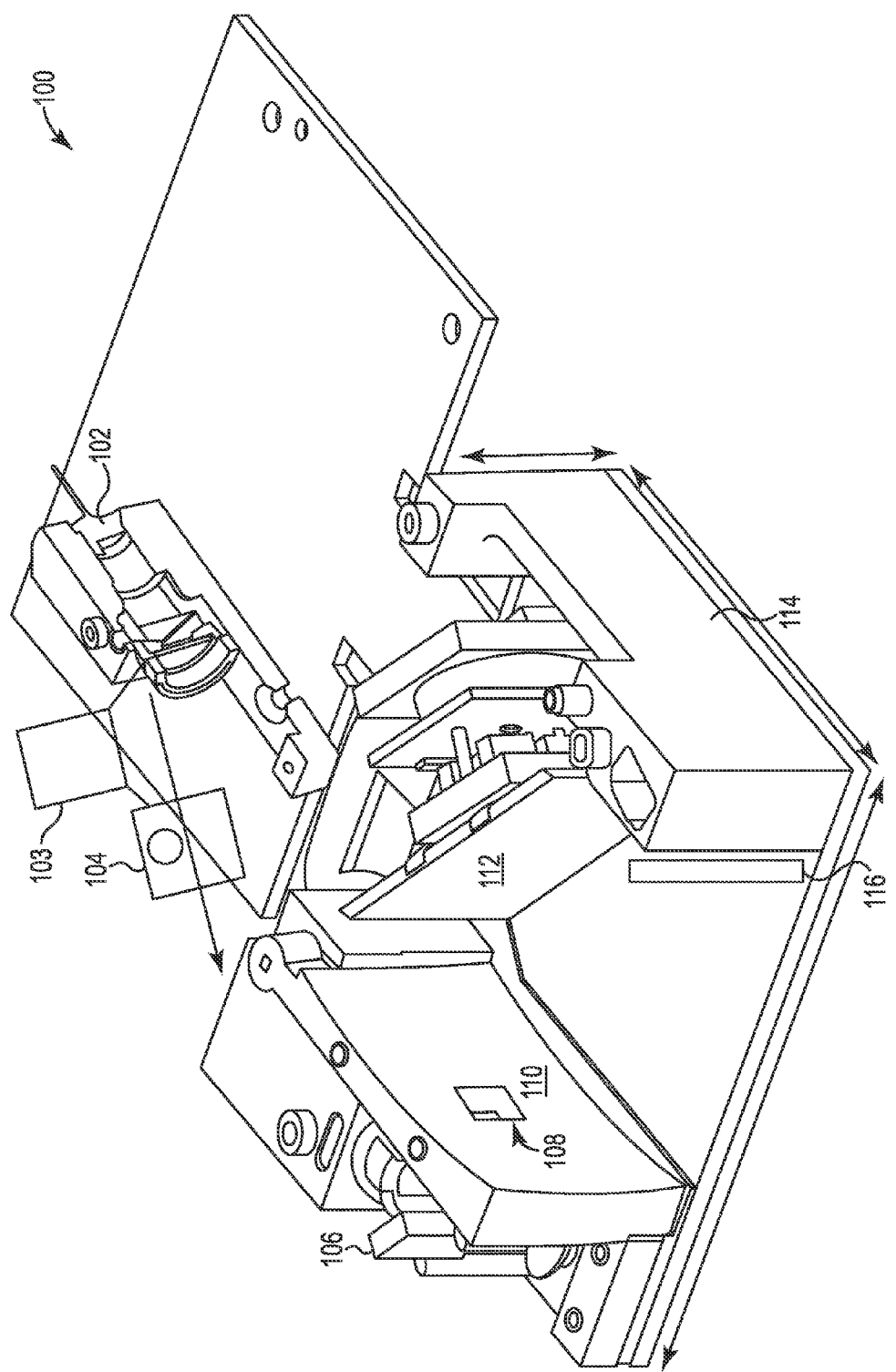
FIG. 1 illustrates an example of a stand-off spectrometry system in accordance with one or more embodiments of the present disclosure.

Stand-off spectrometry systems and methods are described herein. For example, one or more embodiments can include a laser source configured to emit a single-spectral light, and an optical frequency comb (OFC) coupled to the laser source and configured to generate, using the single-spectral light, a multi-spectral light to determine an absorption spectrum of a substance.

For example, the multi-spectral light generated by the OFC can be utilized to provide a scan of the substance (e.g., illuminating the substance with the multi-spectral light and receiving a reflection of the multi-spectral light). The scan can be received by a number of detectors that can determine the absorption spectrum of the substance. The absorption spectrum can be analyzed to determine a composition (e.g., chemical composition) of the substance.

Stand-off spectrometers in accordance with one or more embodiments of the present disclosure can be utilized to identify a potentially hazardous substance from a distance. For example, a user can scan an unidentified substance to determine if the substance is a potential hazard (e.g., substance is used to make an explosive device, substance contains hazardous compounds to the user). The stand-off spectrometry system can include a display to alert the user of specific composition and/or a threat level of the potentially hazardous substance.

Utilizing an OFC coupled to the laser source as described herein can generate a higher multi-spectral light compared to utilizing a blackbody source. In addition, the OFC coupled to the laser source can generate narrower spectral linewidth (e.g., width of a spectral line) that can have a greater radiance compared to utilizing a blackbody source (e.g., six orders of magnitude greater). Thus, the stand-off spectrometry systems in accordance with one or more embodiments of the present disclosure can have a greater accuracy in identifying unknown substances compared to devices utilizing a blackbody source.

In the following detailed description, reference is made to the accompanying drawings that form a part hereof. The drawings show by way of illustration how one or more embodiments of the disclosure may be practiced.

These embodiments are described in sufficient detail to enable those of ordinary skill in the art to practice one or more embodiments of this disclosure. It is to be understood that other embodiments may be utilized and that process, electrical, and/or structural changes may be made without departing from the scope of the present disclosure.

As will be appreciated, elements shown in the various embodiments herein can be added, exchanged, combined, and/or eliminated so as to provide a number of additional embodiments of the present disclosure. The proportion and the relative scale of the elements provided in the figures are intended to illustrate the embodiments of the present disclosure, and should not be taken in a limiting sense.

The figures herein follow a numbering convention in which the first digit or digits correspond to the drawing figure number and the remaining digits identify an element or component in the drawing. Similar elements or components between different figures may be identified by the use of similar digits. For example, 104 may reference element "04" in FIG. 1, and a similar element may be referenced as 304 in FIG. 3.

As used herein, "a" or "a number of" something can refer to one or more such things. For example, "a number of detectors" can refer to one or more detectors.

FIG. 1 illustrates an example of a stand-off spectrometry system 100 in accordance with one or more embodiments of the present disclosure. The stand-off spectrometry system 100 can include a number of elements to provide for scanning a substance and determining an absorption spectrum of the substance. Scanning the substance can include, for example, illuminating the substance with a laser and receiving light from the laser that is reflected by the substance. In some instances, a number of wavelength ranges can be absorbed and/or not reflected by the substance.

AS shown in FIG. 1, the stand-off spectrometry system 100 can include a laser source 102 (e.g., single-spectral laser source, fiber optic light, pump laser, laser scan engine, fiber laser). The laser source 102 can emit single-spectral light (e.g., light with a single wavelength) at a particular wavelength (e.g., 1550 nanometers (nm)). For example, the laser source 102 can be a pump laser that provides single-spectral light at a wavelength of 1550 nm.

The laser source 102 can be coupled to an optical frequency comb (OFC) 104. The OFC can receive the single-spectral light emitted from the laser source 102 and generate a multi-spectral light (e.g., light with a plurality of wavelengths) using the single-spectral light to determine an absorption spectrum of a substance. The multi-spectral light can include a number of wavelengths other than the single wavelength that is emitted by the laser source. For example, the laser source can emit single-spectral light with a single wavelength (e.g., 1550 nm) and the multi-spectral light can include the single wavelength with a plurality of other wavelengths (e.g., 1550 nm, 1552 nm, 1554 nm, 1548 nm).

The number of wavelengths can show up on a spectral graph as a number of spectral lines (e.g., peaks on a scale, increased intensity). The number of spectral lines can be at particular wavelength intervals (e.g., spacing) depending on the specification (e.g., diameter of the comb, gap) of the OFC 104. For example, the number of wavelengths can have an interval of 2 nm. In this example, a spectral graph could show a peak of wavelength intensity at 1550 nm to represent the single wavelength of the laser source 102 and a number of additional peaks of wavelength intensity having intervals of 2 nm (e.g., 1548 nm, 1546 nm, 1552 nm, 1554 nm). Thus, the laser source 102 coupled to the OFC 104 can provide a multi-spectral light (e.g., light comprising a plurality of wavelengths) source having a number of spectral lines (e.g., peak wavelength intensity at a plurality wavelengths within the interval).

The laser source 102 and/or OFC 104 can be coupled to a tuner 103. The tuner 103 can alter the wavelength of the single-spectral light and/or the wavelength range of the multi-spectral light by changing the temperature of the single-spectral light (e.g., laser source 102) and/or the OFC 104. By changing the temperature of the laser source 102 and/or OFC 104, the tuner 103 can alter the wavelengths of the multi-spectral light to a range of wavelengths that corresponds to a predicted absorption range for the substance. For example, the substance can be a suspected explosive device, and the tuner 103 can alter the wavelengths of the multi-spectral light to a range that can detect a number of substances commonly used to make the suspected explosive device.

In some embodiments, a temperature change of 10° Celsius (C) to 20° C. to the laser source 102 and independently to the OFC (e.g., OFC with 100 μm diameter) 104 can increase and/or decrease the wavelength interval of the multi-spectral light by 1 to 2 nm. In some embodiments the temperature change of the OFC can be a change of 1° C. to 100° C. The increase and/or decrease to the wavelength of the multi-spectral light can depend on a number of factors including but not limited to: the single-spectral light wavelength, a comb frequency spacing, and/or a type of single-spectral light.

Equation 1 can be used for predicting a particular spectral range to align an absorption line of the substance with an emission line of the OFC.

$$F_g = f_{laser} + m \times \Delta f \quad \text{Equation 1}$$

Within Equation 1, $F_g$ can be the frequency of a gas absorption line to be measured. For example, the gas absorption line can be a common location (e.g., frequency) for a peak on a spectral graph for a the substance. In addition, within Equation 1, $f_{laser}$ can be the frequency of the laser (e.g., single-spectral light, fiber laser). In addition, within Equation 1, m can be an integer (e.g., positive or negative) that corresponds to a closest comb line compared to $F_g$. Furthermore, within Equation 1, $\Delta f$ can be the OFC frequency spacing. For example, the OFC frequency spacing can be a comb tooth spacing of the OFC. The comb tooth spacing of the OFC can equal a mode locked laser (e.g., a pulsing laser with short duration) repetition rate (e.g., rate of pulsing).

The stand-off spectrometry system 100 can also include a fold mirror 106. The fold mirror 106 can be used to direct (e.g., steer, etc.) the multi-spectral light to a desired direction (e.g., the scan mirror 112, etc.). For example, the fold mirror 106 can be used to direct the multi-spectral light in a specific, fixed direction of a substance if the scan mirror is fixed and/or swept in a direction over a time interval to produce a scan of the substance if the scan mirror is activated. The angle can provide an image (e.g., absorption spectrum image) from a reflection of the substance that can be received by the scan mirror 112 within the stand-off spectrometry system 100. The image can be the absorption spectrum image produced by the scan and reflection of the multi-spectral light on the substance. The substance can be a gas and based on composition can have particular reflective and absorption properties. For example, the substance can have absorption properties that absorb light with a wavelength of 1558 nm. In this example, the stand-off spectrometry system can receive a reflection of light a number of wavelengths, but the intensity of wavelength 1558 nm would be modulated by the absorbing substance.

The image from the scan can be steered through an opening 108 of a collection optic 110 to the scan mirror 112. The scan mirror 112 can receive the image of the multi-spectral light reflected from the substance and reflect the image to a collection optic 110. A distance between the scan mirror 112 and the collection optic 110 can be altered to display a portion of the image (e.g., the absorption spectrum of the substance) on the collection optic 110 and/or focus the image on the collection optic 110. For example, the portion of the image can be a particular range (e.g., range of wavelengths, range of frequencies). The distance between the scan mirror 112 and the collection optic 110 can be altered to focus the received image on the collection optic 110. Focusing the image on the collection optic 110 can include developing a crisper and/or clearer image to enable a number of detectors 114 to determine a composition of the substance.

The image radiation received by the collection optic 110 can be reflected to a grating and/or a prism 116. The grating and/or prism 116 can split the radiation (e.g., the absorption spectrum of the substance, image) from the collection optic 110 into a number of image sections (e.g., a number of absorption spectrum sections, image spectral sections). Each of the number of image spectral sections can include a particular range (e.g., range of wavelengths, range of frequencies).

The number of image sections can be directed to the number of detectors 114. The number of detectors can receive the image spectrum and determine a composition of the substance based on a number of properties of the image. The number of properties of the image can be an absorption spectrum (e.g., evaluation of a number of wavelengths absorbed and/or reflected by the substance) produced by a scan of the substance by the multispectral light provided by the OFC 104. The number of detectors can each be configured to receive and evaluate a different one of the number of image sections. For example, one of the number of detectors can be configured to receive and analyze one of the number of image sections having the particular wavelength range of 1550 nm to 1555 nm wavelengths. That is, the number of image sections can each have a particular wavelength range that corresponds to a particular detector.

The number of detectors 114 can be communicatively coupled to a computing device (not shown in FIG. 1). The computing device can compare the received image (e.g., absorption spectrum) to a database of absorption spectrums for a number of known compositions. For example, the computing device can compare a received absorption spectrum for the unknown substance and compare the received absorption spectrum to a number of absorption spectrums for hazardous compositions (e.g., compositions used to make explosives, compositions harmful to a user). The computing device can utilize a number of comparing techniques used for composition identification based on an absorption spectrum.

The stand-off spectrometry system 100 can also include a display (not shown) to display information relating to the scanned substance. The information relating to the scanned substance can include various results of the comparison. For example, information relating to the scanned substance can include: a common name of a composition from the substance, NFPA hazard ratings, common uses, threat level.

A computing device (not shown in FIG. 1) can include a memory and a processor coupled to memory. Memory can be any type of storage medium that can be accessed by the processor to perform various examples of the present disclosure. For example, memory can be a non-transitory computer readable medium having computer readable instructions (e.g., computer program instructions) stored thereon that are executable by the processor to compare a received absorption spectrum to a database of absorption spectrums for a number of known compositions to identify the composition of the received absorption spectrum in accordance with one or more embodiments of the present disclosure.

Memory can be volatile or nonvolatile memory. Memory can also be removable (e.g., portable) memory, or non-removable (e.g., internal) memory. For example, memory can be random access memory (RAM) (e.g., dynamic random access memory (DRAM) and/or phase change random access memory (PCRAM)), read-only memory (ROM) (e.g., electrically erasable programmable read-only memory (EEPROM) and/or compact-disc read-only memory (CD-ROM)), flash memory, a laser disc, a digital versatile disc (DVD) or other optical disk storage, and/or a magnetic medium such as magnetic cassettes, tapes, or disks, among other types of memory.

Further, memory can be located in the computing device, however, embodiments of the present disclosure are not so limited. For example, memory can also be located internal to another computing resource (e.g., enabling computer readable instructions to be downloaded over the Internet or another wired or wireless connection).

In some embodiments, the information relating to the scanned substance can include a threat level that can be based the common use of the substance. In some cases an individual substance may not be a hazard to a user, however, the substance can be commonly used to make hazardous devices. The threat level can be based, in part, on possible hazardous uses of a non-hazardous substance. For example, the threat level can be based on commonly used chemicals, compositions, and substances used to make explosives. In this example, the unknown substance can be compared to a database to determine if the substance is commonly used in making explosive devices.

The stand-off spectrometry system 100 can be utilized to identify potentially hazardous substances from a safe distance from the substance and without disturbing the potentially hazardous substances. For example, in some cases an explosive device can detonate upon a disturbing the device. In these cases, the stand-off spectrometry system 100 can identify substances of an unknown device and determine if the substances are commonly used for an explosive device.

Figure 2:
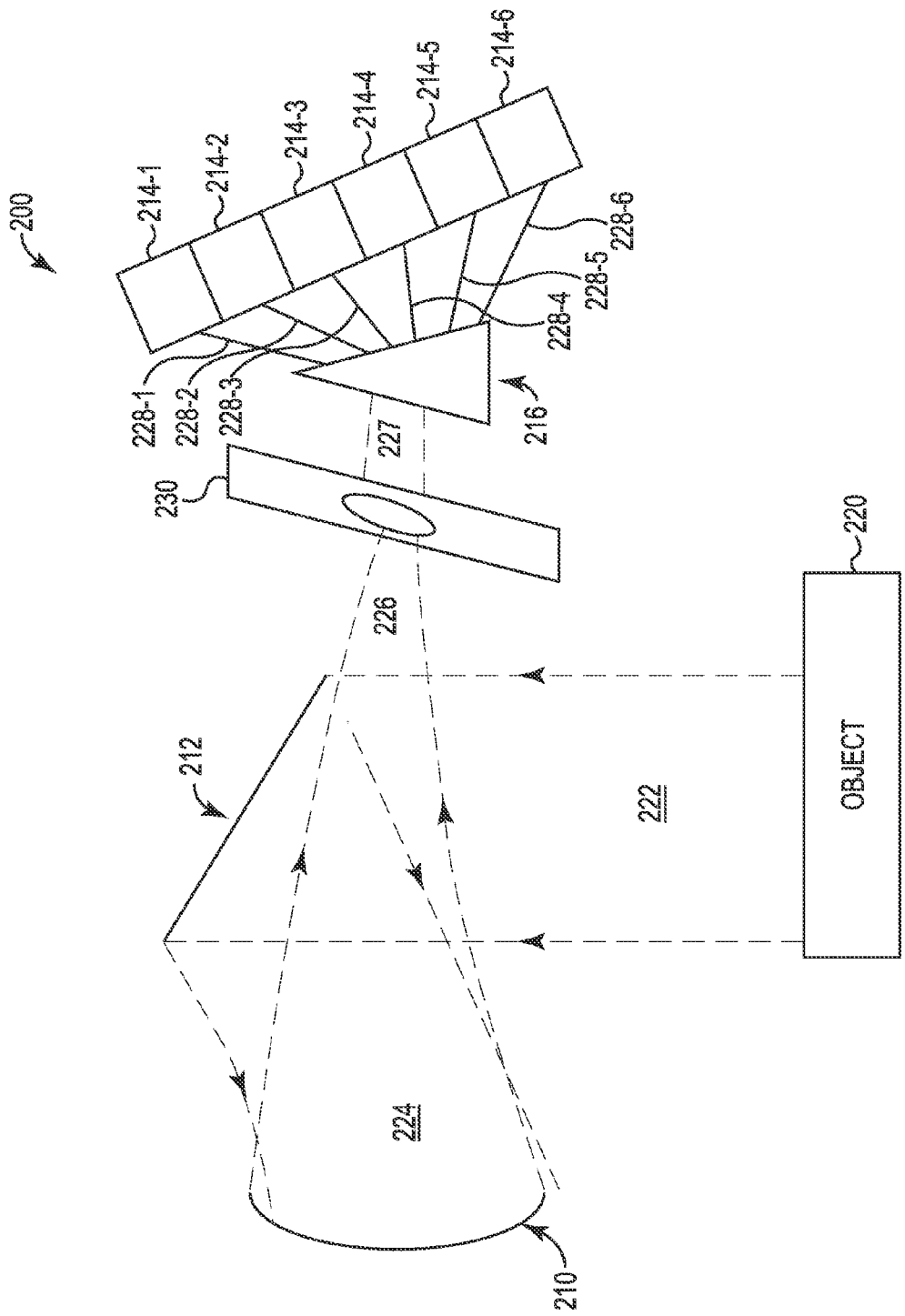
FIG. 2 illustrates an example of a stand-off spectrometry system in accordance with one or more embodiments of the present disclosure.

FIG. 2 illustrates an example of a stand-off spectrometry system 200 in accordance with one or more embodiments of the present disclosure. The system 200 can include an object 220 (e.g., unknown substances). The object 220 can be scanned with a laser source (e.g., laser source 102 previously described in connection with FIG. 1) coupled to an OFC (e.g., OFC 104 previously described in connection with FIG. 1) and configured to provide an absorption spectrum of the object 220. The absorption spectrum can be a representation of a number of wavelengths of light that are absorbed and/or not reflected by the object 220.

When the object 220 is scanned by the laser source coupled to the OFC an absorption spectrum can be produced and received by a scan mirror 212 via a path 222. As described herein, the scan mirror 212 can be located at a number of distances from the object 220 and/or from a collection optic 210. The distance from the scan mirror 212 and the collection optic 210 can be altered to focus an image of the absorption spectrum by the collection optic 210 on detectors 214. Focusing the image of the absorption spectrum can enable the image to be received by a number of detectors 214-1, 214-2, . . . , 214-N.

The image can be reflected and/or steered from the scan mirror 212 to the collection optic 210 via path 224. When the image is focused by altering the distance of the scan mirror 212 the image is transferred through a grating 230 via path 226. The image and/or a portion of the image can pass through the grating 230 and to a prism 216 via path 227.

The grating and/or prism 216 can split the image into a number of image spectral sections 228-1, 228-2, . . . , 228-N. The number of image spectral sections 228-1, 228-2, . . . , 228-N can each comprise a predetermined wavelength range (e.g., 1500 nm-1550 nm). Each of the number of image spectral sections 228-1, 228-2, . . . , 228-N can be steered by the grating 230 and/or prism 216 to a predetermined detector of the number of detectors 214-1, 214-2, . . . , 214-N configured to analyze the predetermined wavelength range of the steered image section. For example, image spectral section 228-1 can have a predetermined range of 1550 nm to 1560 nm and can be steered by the prism 216 to detector 216-1 configured to analyze a wavelength range of 1550 nm to 1560 nm.

Figure 3:
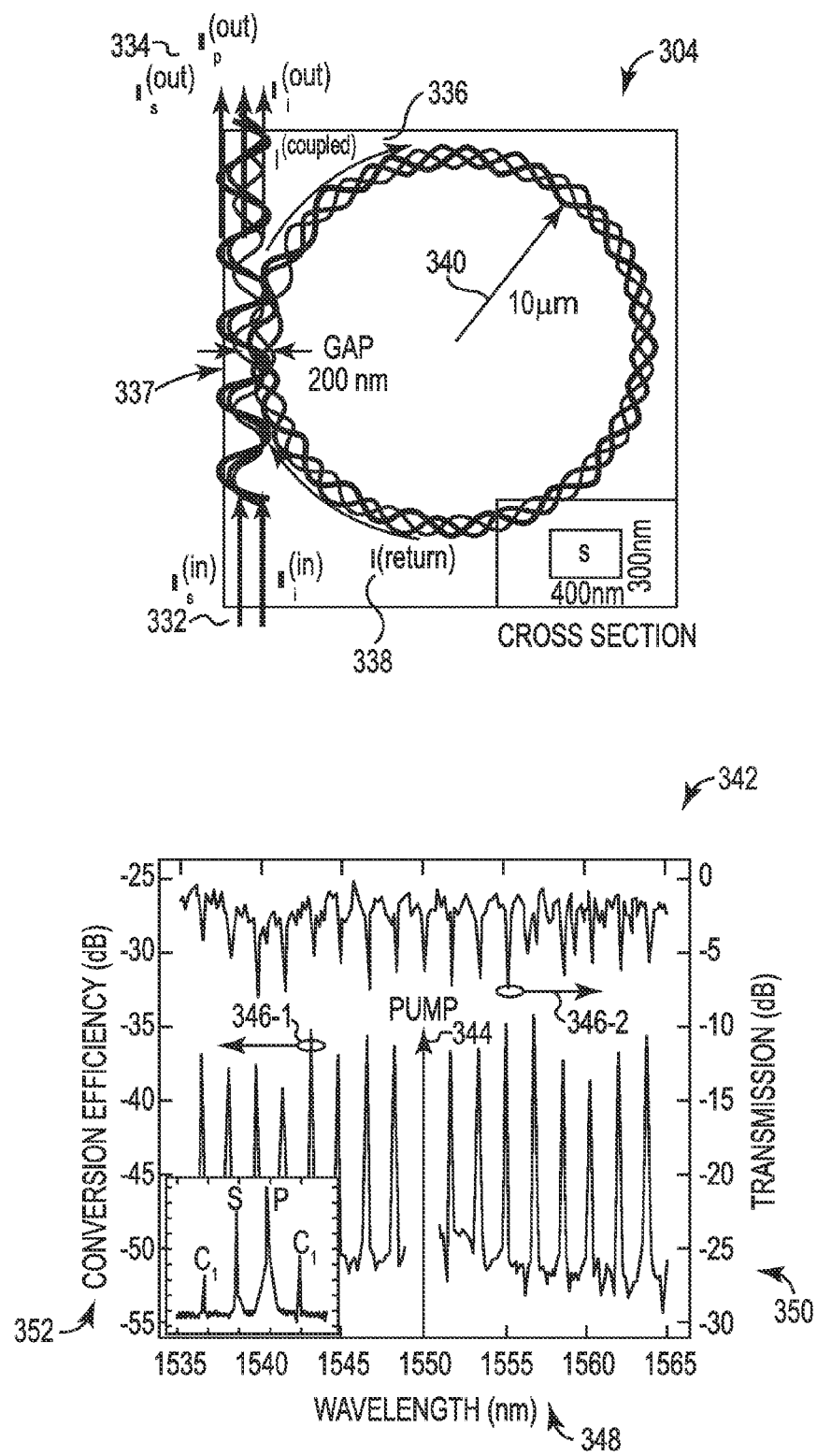
FIG. 3 illustrates an example of an optical frequency comb (OFC) in accordance with one or more embodiments of the present disclosure.

Each of the number of detectors 214-1, 214-2, . . . , 214-N can be communicatively coupled to a computing device (not shown in FIG. 2). The computing device can use the analyses of the number of detectors to determine a number of features of the scanned object 220. The number of features can include, but are not limited to: common name of composition, threat level, NFPA hazard rating, common uses FIG. 3 illustrates an example of an optical frequency comb 304 (OFC) in accordance with one or more embodiments of the present disclosure. The OFC 304 can be configured to receive light (e.g., single-spectral light, fiber laser) through an entry point 332. The OFC 304 can have a variety of specifications based on a desired output of multi-spectral light and/or number of spectral lines. For example, the OFC 304 specifications of the gap 337 (e.g., width of the entry 332/exit 334 path and the comb) can be altered to alter the wavelength output of multi-spectral light. In addition the diameter 340 of the comb can also be altered to alter the wavelength output of the multi-spectral light.

Single-spectral light can enter the OFC 304 through an entry point 332. The guided mode of the single-spectral light can expand to the size of the gap 337 and couple to the ring resonator 336. A first portion of the single spectral light can pass through the exit point 334 while a second portion can enter the ring resonator (e.g., circular path of the OFC 304) at 336 and travel around the comb to the gap 337 at 338. This process can repeat so long as light is emitted through the entry point 332.

The entry of single-spectral light into the ring resonator can interact non-linearly (e.g., via four-wave mixing, with the core material of the ring resonator and thereby generate a number of spectral lines 346-1, 346-2 at a number of intervals). The number of intervals and/or spectral lines can be altered based on the specifications of the OFC 304. In addition, the number of intervals can be altered utilizing a tuner (e.g., tuner 103) to change a temperature of the single spectral light and/or OFC 304, as described herein.

The number of peaks (e.g., spectral lines 346-1, 346-2) can be displayed on a spectral graph 342. The spectral graph 342 can display the number of peaks to represent the wavelength of the single-spectral laser at 344. The wavelength of the laser in this example is displayed as a peak at 1550 nm. The number of spectral lines 346-1, 346-2 can have an increased and/or decreased wavelength compared to the single-spectral laser wavelength 344. The range of wavelengths for the single spectral laser coupled to the OFC 304 can be 1535 nm to 1565 nm. Thus, the OFC can increase the spectral range of the single-spectral laser from a range limited to 1550 nm to a range including 1535 nm to 1565 nm. As reported in the literature, the spectral range can be as large as an octave in frequency.

Although specific embodiments have been illustrated and described herein, those of ordinary skill in the art will appreciate that any arrangement calculated to achieve the same techniques can be substituted for the specific embodiments shown. This disclosure is intended to cover any and all adaptations or variations of various embodiments of the disclosure.

It is to be understood that the above description has been made in an illustrative fashion, and not a restrictive one. Combination of the above embodiments, and other embodiments not specifically described herein will be apparent to those of skill in the art upon reviewing the above description.

The scope of the various embodiments of the disclosure includes any other applications in which the above structures and methods are used. Therefore, the scope of various embodiments of the disclosure should be determined with reference to the appended claims, along with the full range of equivalents to which such claims are entitled.

In the foregoing Detailed Description, various features are grouped together in example embodiments illustrated in the figures for the purpose of streamlining the disclosure. This method of disclosure is not to be interpreted as reflecting an intention that the embodiments of the disclosure require more features than are expressly recited in each claim.

Rather, as the following claims reflect, inventive subject matter lies in less than all features of a single disclosed embodiment. Thus, the following claims are hereby incorporated into the Detailed Description, with each claim standing on its own as a separate embodiment.

What is claimed:

1. A stand-off spectrometry system, comprising: a laser source configured to emit a single-spectral light; an optical frequency comb (OFC) coupled to the laser source and configured to generate, using the single-spectral light, a multi-spectral light to be emitted at a first direction of a substance over a time interval to produce a scan of the substance via a fold mirror, wherein the multi-spectral light comprises a plurality of spectral lines at specific wavelength intervals from the single wavelength based on a diameter of the OFC, and wherein the OFC includes a tuner to alter the specific wavelength intervals of the multi-spectral light to a range of wavelength intervals that correspond to a predicted absorption range of the substance by changing a temperature of the OFC, and wherein the predicted absorption range of the substance corresponds to a number of substances utilized to manufacture explosive devices; a collection optic with an aperture formed therethrough, wherein the fold mirror is positioned on a first side of the collection optic and steers through the aperture the multi-spectral light emitted at the first direction to generate a reflection by the substance; a scan mirror positioned on a second side of the collection optic to receive an image from the reflection of the multi-spectral light from the substance at a second direction that is opposite from the first direction, wherein the scan mirror is adjusted to reflect the image from the reflection of the multi-spectral light from the substance onto the collection optic; a grating to receive the reflection of the multi-spectral light from the collection optic to split radiation of the reflection into a number of image sections, wherein each of the number of image sections include a specific range of wavelengths; a number of detectors to receive the number of image sections from the reflection of the multi-spectral light from the substance from the grating to determine an absorption spectrum of the substance, wherein each of the number of detectors corresponds to a particular range of wavelengths; and a display to display a hazardous threat level of the substance based on the absorption spectrum of the substance.

2. The system of claim 1, wherein the system includes the tuner coupled to the laser source and configured to alter a wavelength of the single-spectral light and the range of temperature changes between 10 and 20 degrees Celsius.

3. The system of claim 1, wherein the tuner is coupled to the OFC and configured to alter a wavelength range of the multi-spectral light.

4. The system of claim 1, wherein the tuner is configured to alter a wavelength of the single-spectral light by adjusting the wavelength within one free spectral range of the resonator or the number of comb intervals within one comb spacing.

5. A method for providing stand-off spectrometry, comprising:
   tuning a single-spectral laser source and an optical frequency comb (OFC) for emitting, at a first direction of a substance, a plurality of spectral lines at specific wavelength intervals from the single wavelength for receiving, at a second direction that is opposite of the first direction, a number of absorption wavelengths of the substance;
   altering a wavelength of a single-spectral light, using a tuner associated with the OFC, by changing a temperature of the OFC;
   steering, by a fold mirror, the single-spectral light emitted at the first direction through an aperture formed in a collection optic to be reflected by a scan mirror at the substance;
   receiving at the scan mirror the single-spectral light emitted at the first direction;
   scanning the substance via the scan mirror reflecting the single-spectral light emitted at the first direction;
   receiving an image of the substance at the scan mirror;
   steering the image at the second direction by reflection from the scan mirror to the collection optic;
   receiving the image at the collection optic;
   steering the image to a number of detectors;
   determining an absorption spectrum for the substance based, at least in part, on the number of absorption wavelengths of the image; and displaying a hazardous threat level associated with a common and combined use of the substance based on the absorption spectrum for the substance.

6. The method of claim 5, wherein tuning the single-spectral laser source and the OFC includes changing a temperature of the single-spectral laser source and the OFC.

7. The method of claim 5, wherein the method includes splitting the number of absorption wavelengths into a number of absorption wavelength sections.

8. The method of claim 7, wherein the number of absorption wavelength sections each have a particular wavelength range that corresponds to a particular detector.

9. The method of claim 5, wherein receiving a number of absorption wavelengths includes receiving a scanned image from a laser scan engine utilizing the single-spectral laser coupled to the OFC.

10. The method of claim 5, wherein tuning the multispectral laser and the OFC includes altering a range of the number of absorption wavelengths to correspond to a predicted absorption range of the substance.

11. The method of claim 5, wherein steering the image at the second direction includes altering a distance between the scan mirror and the collection optic to improve a focus of the image on the collection optic.

12. The method of claim 5, wherein steering the image at the second direction includes altering a distance between the scan mirror and the collection optic to display a portion of the image on the collection optic.

13. A stand-off spectrometry system including an enclosure, comprising:
    an optical frequency comb (OFC) configured to provide a number of spectral lines, wherein the OFC includes a tuner to alter a wavelength of a single-spectral light by changing a temperature of the OFC;
    a laser scan engine coupled to the OFC to emit the number of spectral lines at a first direction of a substance via a fold mirror;
    a collection optic with an aperture formed therethrough, wherein the fold mirror is positioned on a first side of the collection optic and steers through the aperture the multi-spectral light emitted at the first direction to be reflected by the substance;
    a scan mirror positioned on a second side of the collection optic to receive an image reflected by the substance at a second direction that is opposite from the first direction, wherein the scan mirror is adjusted to reflect the image onto the collection optic, and wherein the substance is external to the enclosure;
    a number of detectors configured to receive the image from the collection optic and determine an absorption spectrum of the substance based on the image; and
    a display to display a hazardous threat level of the substance based on the absorption spectrum of the substance.

14. The apparatus of claim 13, wherein the system includes:
    the collection optic configured to display the absorption spectrum of the substance; and
    a grating configured to split the absorption spectrum into a number of segments, wherein the number of segments comprise a particular wavelength range.

15. The system of claim 14, wherein each of the number of detectors is configured to evaluate the particular frequency range of a corresponding segment.

16. The system of claim 13, wherein the tuner is configured to alter the wavelength range of the number of spectral lines provided by the OFC to a predicted absorption range of the substance.

17. The system of claim 13, wherein the tuner is coupled to the laser scan engine and is configured to change the temperature of the laser scan engine.

18. The system of claim 13, wherein the tuner is configured to alter the number of spectral lines provided by the OFC by changing the temperature of the OFC.

19. The system of claim 18, wherein the temperature change of the OFC is change of 1 degree Celsius to 100 degrees Celsius.

20. The system of claim 13, wherein the substance is a gas.

* * * * *